United States Patent [19]
Yamawaki et al.

[11] Patent Number: 5,629,111
[45] Date of Patent: May 13, 1997

[54] NICKEL ELECTRODE ACTIVE MATERIAL; A NICKEL ELECTRODE AND A NICKEL ALKALI STORAGE CELL USING SUCH NICKEL ELECTRODE ACTIVE MATERIAL; AND PRODUCTION METHODS OF SUCH MATERIAL, ELECTRODE, AND CELL

[75] Inventors: Akifumi Yamawaki, Itano-gun; Shinsuke Nakahori, Naruto; Motoo Tadokoro; Takeo Hamamatsu, both of Itano-gun; Yoshitaka Baba, Naruto, all of Japan

[73] Assignee: Sanyo Electric Co. Ltd., Osaka, Japan

[21] Appl. No.: 529,980

[22] Filed: Sep. 19, 1995

[30] Foreign Application Priority Data

Sep. 20, 1994 [JP] Japan .................................. 6-225104
May 22, 1995 [JP] Japan .................................. 7-122329

[51] Int. Cl.$^6$ ........................... H01M 4/32; H01M 4/52; H01M 4/58
[52] U.S. Cl. .................. 429/223; 204/291; 204/292
[58] Field of Search ...................... 429/223; 204/291, 204/292

[56] References Cited

U.S. PATENT DOCUMENTS

| Re. 34,752 | 10/1994 | Oshitani et al. | 429/223 |
|---|---|---|---|
| 3,752,706 | 8/1973 | Melin | 429/223 |
| 4,049,027 | 9/1977 | Sieger | 429/223 |
| 4,844,999 | 7/1989 | Oshitani et al. | 429/223 |

FOREIGN PATENT DOCUMENTS

| 0544011A1 | 6/1993 | European Pat. Off. . |
| 1-200555 | 8/1989 | Japan . |
| 2109261 | 4/1990 | Japan . |
| 4638777 | 12/1992 | Japan . |
| 6-38336 | 5/1994 | Japan . |

OTHER PUBLICATIONS

Derwent abstract for and figure from WO91/20101—Blanchard et al. Dec. 26, 1991.
CAS abstract for JP 04109557—Tamagawa et al. Apr. 10, 1992.
CAS abstract for DE 3806943 Sep. 15, 1988.
Ezhov et al., Structure Modification and Change of Electrochemical Activity of Nickel Hydroxides, J. Electrochem. Soc., 138(4), Apr. 1991.

Primary Examiner—Kathryn L. Gorgos
Assistant Examiner—Alex Noguerola
Attorney, Agent, or Firm—Armstrong, Westerman, Hattori, McLeland & Naughton

[57] ABSTRACT

Fine-grained nickel electrode active material, each of which contributing to electrode reaction; production method of the fine-grained nickel electrode active material; and a nickel alkali storage cell of high capacity which is excellent in over discharge characteristics. In order to produce the fine-grained nickel electrode active material, fine-grained nickel hydroxide is precipitated by adding a given amount of alkali to solution in which at least a nickel compound is dissolved while the solution is stirred. Each of the fine-grained nickel hydroxide has pores with 20 vol % or more of a combined volume of the pores being composed of pores of diameter 60 Å or greater. Next, a given amount of alkali is gradually added to suspension including the fine-grained nickel hydroxide and dissolved cobalt compound so that cobalt hydroxide is precipitated on the external surface of the fine-grained nickel hydroxide. The fine-grained nickel electrode active material is produced in the above mentioned way. Each of the fine-grained nickel electrode active material comprises a nickel hydroxide and cobalt oxide having distorted crystal structure and oxidation number higher than +2. The nickel hydroxide has pores whose diameters are 60 Å or greater. And the volume of such pores amounts to 20 vol % or more of the combined volume of all of the pores.

14 Claims, 2 Drawing Sheets

NICKEL ELECTRODE ACTIVE MATERIAL; A NICKEL ELECTRODE AND A NICKEL ALKALI STORAGE CELL USING SUCH NICKEL ELECTRODE ACTIVE MATERIAL; AND PRODUCTION METHODS OF SUCH MATERIAL, ELECTRODE, AND CELL

BACKGROUND OF THE INVENTION (1) Field of the Invention

The present invention relates to nickel electrode active material; a nickel electrode and a nickel alkali storage cell using such nickel electrode active material; and production methods of such material, electrode, and cell. Specifically, it relates to improvement of the nickel active material used for the nickel alkali storage cell.

(2) Prior Art

Recently, in the rapid spread of portable apparatus, a storage cell of high efficiency is in increasing demand.

In this background, there has been various improvement in a nickel positive electrode for a nickel alkali storage cell. One of the examples is disclosed in Japanese Patent Publication No. 6-38336, which is about how to keep the volume of holes less than 0.05 ml/g by limiting the development of internal transition pores whose radiuses are more than 30 Å, in time of producing nickel hydroxide powder which is used as active material for a nickel positive electrode. According to this prior art, nickel hydroxide is changed to high-density nickel hydroxide powder. When this high-density nickel hydroxide powder is used as active material, packing density on the electrode substrate is increased, so that energy density of the electrode can be improved. And in a nickel hydroxide electrode in which the high-density nickel hydroxide powder is packed, production of $\gamma$-NiOOH (oxide having high oxidation number) accompanied by the progress of charge and discharge cycle is little. So passivation of nickel active material is controlled, and the utilization factor improves. Therefore, cell capacity of the nickel alkali storage cell can be improved.

However, consideration was not given enough to each of the fine-grained active material. There are some points to be improved in the utilization factor of the active material and over discharge characteristics. In the prior art, it was difficult to obtain values over 90% in the utilization factor and over discharge characteristics while method of measurement mentioned later is being employed.

SUMMARY OF THE INVENTION

It is an object of the present invention to provide fine-grained nickel active material which can certainly contribute to electrode reaction, and the production method of such material, so that higher energy density and higher efficiency of a nickel alkali storage cell can be realized.

The above object can be realized by the following composition.

(1) Fine-grained nickel electrode active material, each of which comprising at least nickel hydroxide and cobalt and/or a cobalt compound, the cobalt and/or cobalt compound being formed on the external surface of the nickel hydroxide, the fine grained nickel electrode active material having pores with 20 vol % or more of a combined volume of the pores being composed of pores of diameter 60 Å or greater.

In such composition, as cobalt and/or cobalt compound operate to improve conductivity among fine-grained active material as much as possible, small amount of cobalt and/or cobalt compound can be used efficiently. Moreover, the ratio of the nickel hydroxide can be increased contrary to the small amount of the cobalt and/or cobalt compound. Therefore, nickel electrode active material of higher energy density can be obtained.

Such fine-grained active material has large specific surface area which can contribute to electrochemical reaction, so optimum nickel active material of high energy density can be obtained. Therefore, nickel electrode active material of high utilization factor can be produced, and high energy density of an electrode can be realized.

(2) The cobalt compound may be cobalt oxide having distorted crystal structure and oxidation number higher than +2.

Cobalt having oxidation number higher than +2 means that average oxidation number of cobalt oxide is higher than +2. Therefore the effects mentioned above are shown even more remarkably.

Specifically, the cobalt oxide having high oxidation number has high conductivity of electrons compared to cobalt oxide having low oxidation number. As the cobalt oxide having distorted crystal structure has more spaces than cobalt oxide having ordered and dense crystal structure, it exists on the external surface of the fine-grained nickel hydroxide in a way that it does not prevent passage of the electrolyte. Moreover, cobalt oxide having distorted crystal structure has more molecular orientations and spaces, so it mixes with nickel hydroxide on a molecular level on the surface of the nickel hydroxide, so that the two of them combine tightly. So in an electrode using such nickel active material, sending and receiving electrons goes smoothly, and high efficiency of a cell can be realized.

(3) A production method of the fine-grained nickel electrode active material comprises: a first step for precipitating fine-grained nickel hydroxide having pores with 20 vol % or more of a combined volume of the pores being composed of pores of diameter 60 Å or greater, by adding a given amount of alkali to solution in which at least a nickel compound is dissolved while the solution is stirred; and a second step for precipitating cobalt hydroxide on external surface of the fine-grained nickel hydroxide precipitated in the former step, by gradually adding a given amount of alkali to suspension including the fine-grained nickel hydroxide and a dissolved cobalt compound while the suspension is stirred.

In the first step, the fine-grained nickel hydroxide can easily be obtained by adjusting the speed to add alkali, strength with which the solution is stirred, and pH of the solution.

In the second step, a small amount of dissolved nickel compound is permeated into the pores of the fine-grained nickel hydroxide before the addition of alkali. By the addition of alkali, the dissolved nickel compound is precipitated inside the pores of the nickel hydroxide in a way that it combines tightly with the cobalt hydroxide precipitated on the external surface of the nickel hydroxide.

Therefore, cobalt hydroxide is precipitated on the external surface of the fine-grained nickel hydroxide thickly, and thinly on the internal surface.

(4) The production method of the fine-grained nickel electrode active material may further comprise a third step for changing the cobalt compound to cobalt oxide having higher oxidation number, by heating the fine-grained nickel hydroxide having cobalt hydroxide on the external surface in hydroxide of alkali metal and oxygen.

By the third step, fine-grained nickel electrode active material, on whose external surface cobalt oxide having high oxidation number and good conductivity exists, can be obtained.

(5) The third step may comprise: an alkali impregnation sub-step for impregnating solution of alkali metal hydroxide into the fine-grained nickel hydroxide having cobalt hydroxide on the external surface; and a heat treatment sub-step for changing the cobalt and/or cobalt compound to cobalt oxide having distorted crystal structure and oxidation number higher than +2, by heating the alkali-impregnated fine-grained nickel hydroxide having cobalt hydroxide on the external surface, to 50° C.–150° C. in atmosphere including oxygen. Then, all or a part of the crystal structure of each component of the fine-grained nickel active material is destroyed. And oxidation of cobalt or the cobalt compound of the fine-grained nickel active material is greatly promoted so that cobalt oxide having oxidation number higher than +2 can be produced.

Problems arise if the heating temperature is outside the range of 50° C.–150° C. If the heating temperature is less than 50° C., oxidation does not go smoothly, and disorder of crystal structure is insufficient. On the other hand, when the heating temperature is more than 150° C., crystal structure of the active material changes, and utilization factor goes down. So optimum temperature of the treatment to increase oxidation number should be the range of 50° C.–150° C.

(6) A nickel positive electrode for an alkali storage cell comprises: fine-grained nickel electrode active material, each of which has at least nickel hydroxide and cobalt and/or a cobalt compound, the cobalt and/or cobalt compound being formed on the external surface of the nickel hydroxide, the fine-grained nickel electrode active material having pores with 20 vol % or more of a combined volume of the pores being composed of pores of diameter 60 Å or greater; and one of metal zinc powder of 1–5 wt % against the fine-grained nickel electrode active material, and zinc compound powder of 1–5 wt % in metal zinc term, against the fine-grained nickel electrode active material, the metal zinc powder and the zinc compound powder being added to the fine-grained nickel electrode active material.

In the nickel positive electrode, the fine-grained nickel electrode active material shows the effects mentioned already, and the zinc controls the generation of γ-oxynickel hydroxide. So a nickel positive electrode for an alkali storage cell having large capacity and excellent cycle characteristics can be obtained.

The amount of metal zinc and the like should be 1–5 wt % against the fine-grained nickel electrode active material. If the amount is less than 1 wt %, it does not control the generation of γ-oxynickel hydroxide very much, so efficiency of a cell goes down. On the other hand, when the amount is more than 5 wt %, the amount of nickel hydroxide relatively goes down, which is not preferable in that the capacity per unit active material becomes small.

(7) The cobalt compound may be cobalt oxide having distorted crystal structure and oxidation number higher than +2.

The fine-grained active material having such cobalt oxide has excellent conductivity, so energy density of the nickel positive electrode improves.

(8) A nickel alkali storage cell comprises: a nickel electrode, whose main ingredient is fine-grained nickel electrode active material, each of which has at least nickel hydroxide and cobalt and/or a cobalt compound, the cobalt and/or cobalt compound being formed on the external surface of the nickel hydroxide, and each of which also has pores with 20 vol % or more of a combined volume of the pores being composed of pores of diameter 60 Å or greater; a negative electrode placed spatially apart from the nickel electrode; and alkali electrolyte including hydroxide of alkali metal of 7–8.5N and lithium hydroxide.

The nickel alkali storage cell of above composition can show the effects of the fine-grained nickel electrode active material of (1) remarkably. And the alkali electrolyte including the lithium hydroxide improves the chargeability at high temperature. So a nickel alkali storage cell of excellent cell capacity and cycle characteristics can be obtained.

The concentration of the hydroxide of alkali metal should be 7–8.5N. When it is less than 7N, utilization factor of active material goes down; when it is more than 8.5N, permeability of the electrolyte goes down.

(9) The cobalt compound may be cobalt oxide having distorted crystal structure and oxidation number higher than +2.

Efficiency of the positive electrode improves, resulting in better cell capacity, cycle characteristics, and cell efficiency.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawing.

(a) is for a standard cobalt hydroxide crystal;

(b) is for a standard cobalt hydroxide crystal which was given a treatment to increase oxidation number.

DESCRIPTION OF THE PREFERRED EMBODIMENTS

The present invention is described in the following embodiments. Embodiments 1 and 2 are for fine-grained nickel active materials; Embodiments 3–5 are for nickel electrodes; Embodiments 6–9 are for nickel alkali storage cells. Comparative Examples 1–4 are for nickel active materials; Comparative Examples 5–8 are for nickel electrodes; Comparative Examples 9–12 are for nickel alkali storage cells.

Embodiment 1

While mixed aqueous solution of nickel sulfate, zinc sulfate, cobalt sulfate with a mole ratio of nickel, zinc, cobalt being 1:0.02:0.05 is stirred, aqueous solution of sodium hydroxide is gradually added so that nickel hydroxide is precipitated, pH being stabilized at 13–14.

Aqueous solution of cobalt sulfate of specific gravity 1.30 and aqueous solution of sodium hydroxide of 25 wt % are added to the solution in which nickel hydroxide is precipitated, pH being kept at 9–10, so that cobalt hydroxide is precipitated on surface of the precipitated nickel hydroxide. Then the precipitated material is washed by water and dried so that fine-grained nickel-zinc-cobalt type nickel active material having pores whose diameters are 60 Å or greater is produced. The volume of such pores amounts to 20 vol % or more (32.4 vol %, see FIG. 1) of the combined volume of all of the pores. The fine-grained nickel active material thus produced is hereinafter referred to as nickel active material $A_1$ of the present invention.

The fine-grained nickel active material $A_1$ can be easily produced by adjusting speed of adding alkali, strength with which the solution is stirred, and pH of the solution, all of which affect the pore distribution of the active material.

Embodiment 2

Aqueous solution of sodium hydroxide of 25 wt % is added to the fine-grained nickel active material produced in the same way as in the Embodiment 1, so that fine-grained nickel active material impregnated with aqueous solution of sodium hydroxide is produced. Next, the fine-grained active material is heated in 100° C. air for 0.5 hour. This heat treatment impregnating alkali is a method for increasing oxidation number, which is hereinafter referred to as treatment to increase oxidation number in the present specification.

Figure 1:
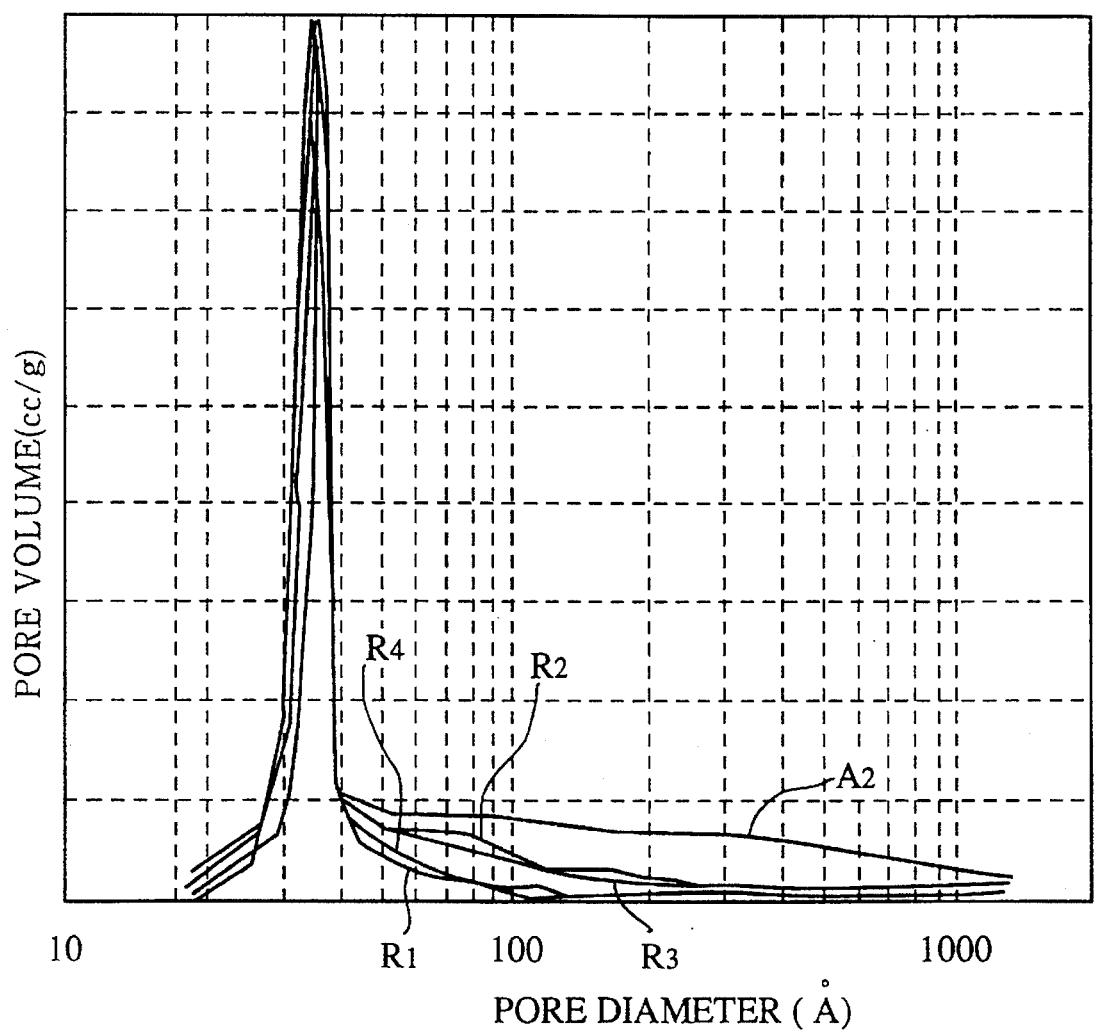
FIG. 1 shows pore distribution of fine-grained nickel active material by BET absorption treatment.

The nickel active material produced in the above mentioned way is hereinafter referred to as nickel active material $A_2$ of the present invention, the $A_2$ having many pores with 20 vol % or more of a combined volume of the pores being composed of pores of diameter 60 Å or greater as shown in FIG. 1.

Embodiments 3–4

Nickel electrodes $EA_1$ and $EA_2$ of the present invention are respectively produced from the nickel active materials $A_1$ and $A_2$ in the Embodiments 1 and 2. The production method follows next.

Active material slurry is produced by mixing 100 parts by weight of the fine-grained nickel electrode active materials $A_1$, $A_2$ and 50 parts by weight of aqueous solution of hydroxy propyl cellulose of 0.2 wt %. The active material slurry is filled up in a foamed nickel having a porosity of 95% and a thickness of 1.6 mm. Then the foamed nickel is dried. After that it is pressed to 0.6 mm in thickness so that the nickel electrodes $EA_1$ and $EA_2$ of the present invention are produced.

The difference between the $EA_1$ and the $EA_2$ is whether the treatment to increase oxidation number has been applied to the fine-grained electrode active material. It is only applied to the active material of the electrode $EA_2$.

Embodiment 5

Nickel electrode $EA_3$ of the present invention is produced in the same way as in the Embodiment 3 except that mixed powder of the fine-grained nickel electrode active material $A_2$ and metal zinc of 2 wt % against the fine-grained nickel active material are used as electrode active material. The amount of the metal zinc should be within 1–5 wt % against the fine-grained nickel electrode active material. A zinc compound of the same molar number can substitute for the metal zinc.

The electrode $EA_3$ differs from the electrode $EA_2$ in that zinc is added.

Embodiments 6–8

Nickel-hydrogen alkali storage cells X-$EA_1$, X-$EA_2$, and X-$EA_3$ are produced in the following manner. Each of their positive electrodes are the nickel electrodes $EA_1$, $EA_2$, and $EA_3$ in the Embodiments 3, 4, and 5. Each of their negative electrodes has active material of hydrogen-absorbing alloy.

Production method of the negative electrode and the cells follow next.

(Production of Negative Electrode)

Misch metal (Mm; a mixture of rare earth elements), nickel, cobalt, aluminium and manganese are mixed in a ratio of 1:3.6:0.6:0.2:0.6. This mixture is heated in a high frequency induction furnace of argon gas atmosphere and cooled in a well-known method, so that an ingot of hydrogen-absorbing alloy, which is expressed by compositional formula $Mm_{1.0}Ni_{3.6}Co_{0.6}Al_{0.2}Mn_{0.6}$, is produced. Then the ingot of hydrogen-absorbing alloy is mechanically pulverized into hydrogen-absorbing alloy powder. The average size of each grain of the powder is about 100 μm. Then binder like polyethylene oxide and a little water are added to the hydrogen-absorbing alloy powder to produce hydrogen-absorbing alloy paste. The paste is applied to punched metal. Then the punched metal is dried. After that it is pressed to about 0.4 mm in thickness to produce a negative electrode of hydrogen-absorbing alloy.

(Production of Cells)

The nickel electrodes $EA_1$, $EA_2$, $EA_3$, and the negative electrodes are placed on both sides of three well-known separators, respectively, and each of the layers is rolled and injected into a cell vessel. Next, potassium hydroxide solution of 7–8.5N as electrolyte is injected into each of the cell vessels. Then the cell vessels are sealed.

After that, activation treatment by charging and discharging is applied to the cells to produce sealed nickel-hydroxide storage cells (AA size, nominal capacity 1200 mAh).

The storage cells produced above are hereinafter referred to as the storage cells X-$EA_1$, X-$EA_2$, and X-$EA_3$ of the present invention, each of which comprising the nickel electrodes $EA_1$, $EA_2$, and $EA_3$ as the positive electrodes.

Embodiment 9

A nickel-hydroxide alkali storage cell is produced in the same way as in the Embodiment 7 except that potassium hydroxide solution of 7–8.5N including lithium hydroxide of 15 mol % concentration is used as electrolyte.

The storage cell produced above is hereinafter referred to as storage cell X-$EA_4$ of the present invention.

Comparative Example 1

While mixed aqueous solution of nickel sulfate and zinc sulfate with a mole ratio of nickel to zinc being 1:0.02 is stirred, aqueous solution of sodium hydroxide is gradually added so that nickel hydroxide is precipitated, pH being stabilized at 10–11. The precipitated nickel hydroxide is washed by water and dried so that fine-grained nickel electrode active material is obtained.

The fine-grained nickel-zinc type active material is hereinafter referred to as nickel active material $R_1$ of the Comparative Example, in which creation of pores whose diameters are 60 Å or greater is not promoted as shown in FIG. 1 and Table 1.

Comparative Example 2

Fine-grained nickel electrode active material, in which development of pores whose diameters are 60 Å or greater is promoted, is obtained in the same way as in the Comparative Example 1 except that concentration of aqueous solution of sodium hydroxide and strength with which the solution is stirred are changed.

The nickel-zinc type active material produced above is hereinafter referred to as nickel active material $R_2$ of the Comparative Example. Pore distribution of the $R_2$ is shown in FIG. 1. The difference between the $R_2$ and the $R_1$ is the percentage of pores whose diameters are 60 Å or greater (see FIG. 1).

Comparative Example 3

While mixed aqueous solution of nickel sulfate, zinc sulfate, and cobalt sulfate with a mole ratio of nickel, zinc, and cobalt being 1:0.02:0.05 is stirred, aqueous solution of sodium hydroxide is gradually added so that nickel hydroxide is precipitated, pH being stabilized at 13–14.

The precipitated nickel hydroxide is washed by water and dried so that fine-grained nickel-zinc-cobalt type nickel active material, which is hereinafter referred to as nickel active material $R_3$ of the Comparative Example, is obtained.

The nickel active material $R_3$ is different from the nickel active material $A_1$ in the Embodiment 1 in that cobalt is not precipitated on the external surface of the nickel hydroxide.

Comparative Example 4

While mixed aqueous solution of nickel sulfate, zinc sulfate, cobalt sulfate with a mole ratio of nickel, zinc, cobalt being 1:0.02:0.05 is stirred, aqueous solution of sodium hydroxide is gradually added so that nickel hydroxide is precipitated, pH being stabilized at 10–11.

The nickel hydroxide is washed by water and dried so that fine-grained nickel-zinc-cobalt type nickel active material is obtained. Then cobalt sulfate and sodium hydroxide are added to the fine-grained nickel-zinc-cobalt type nickel active material so that cobalt hydroxide is precipitated on the surface of the precipitated nickel hydroxide. The precipitated material is washed by water and dried so that fine-grained nickel-zinc-cobalt type active material is obtained.

While pH is kept at 9–10, aqueous solution of cobalt sulfate with specific gravity of 1.3 and aqueous solution of sodium hydroxide of 25 wt % are added to the solution in which nickel hydroxide is precipitated. Then cobalt hydroxide is precipitated on the surface of the precipitated nickel hydroxide. Then the precipitated material is washed by water, dried, and given the treatment to increase oxidation number as explained in the Embodiment 2 so that fine-grained nickel-zinc-cobalt type nickel active material is obtained.

The fine-grained nickel-zinc-cobalt type nickel active material produced above is hereinafter referred to as nickel active material $R_4$ of the Comparative Example. The nickel active material $R_4$ is different from the nickel active material $A_1$ in the Embodiment 1: The volume of the pores whose diameters are 60 Å or greater is less than 20 vol % of the combined volume of all of the pores. (see FIG. 1, Table 1).

Comparative Examples 5–8

Four electrodes of Comparative Examples are produced in the same way as in the Embodiment 3 except that the nickel active materials $R_1$, $R_2$, $R_3$, and $R_4$ of the Comparative Examples are used as nickel active materials.

The electrodes produced above are hereinafter referred to as electrodes $ER_1$, $ER_2$, $ER_3$, and $ER_4$ of the Comparative Examples. Each of them corresponds to the type of the nickel active materials used in the positive electrodes.

Table 1 shows percentage of pores whose diameters are 60 Å or greater in the nickel active materials $A_1$, $A_2$ and the nickel active materials $R_1$–$R_4$ of the Comparative Examples. The values are calculated based on the pore distribution of the fine-grained nickel active material by BET absorption treatment as shown in FIG. 1. The total volume of the pores having diameters 16 Å–400 Å is treated as the volume of all of the pores, and the total volume of the pores having diameters 60 Å–400 Å is treated as the volume of pores having diameters 60 Å or greater.

TABLE 1

| active materials | percentage of pores whose diameters are 60 Å or greater |
|---|---|
| $A_1$ | 32.4 vol % |
| $A_2$ | 40.4 vol % |
| $R_1$ | 14.4 vol % |
| $R_2$ | 27.8 vol % |
| $R_3$ | 26.5 vol % |
| $R_4$ | 15.7 vol % |

Comparative Examples 9–12

Storage cells are produced in the same ways as in the Embodiments 6–8. And for each cell, the electrodes $ER_1$, $ER_2$, $ER_3$, and $ER_4$ of the Comparative Examples are used. The storage cells are hereinafter referred to as storage cells X-$ER_1$, X-$ER_2$, X-$ER_3$, X-$ER_4$ of the Comparative Examples.

(Experiment 1)

Figure 2:
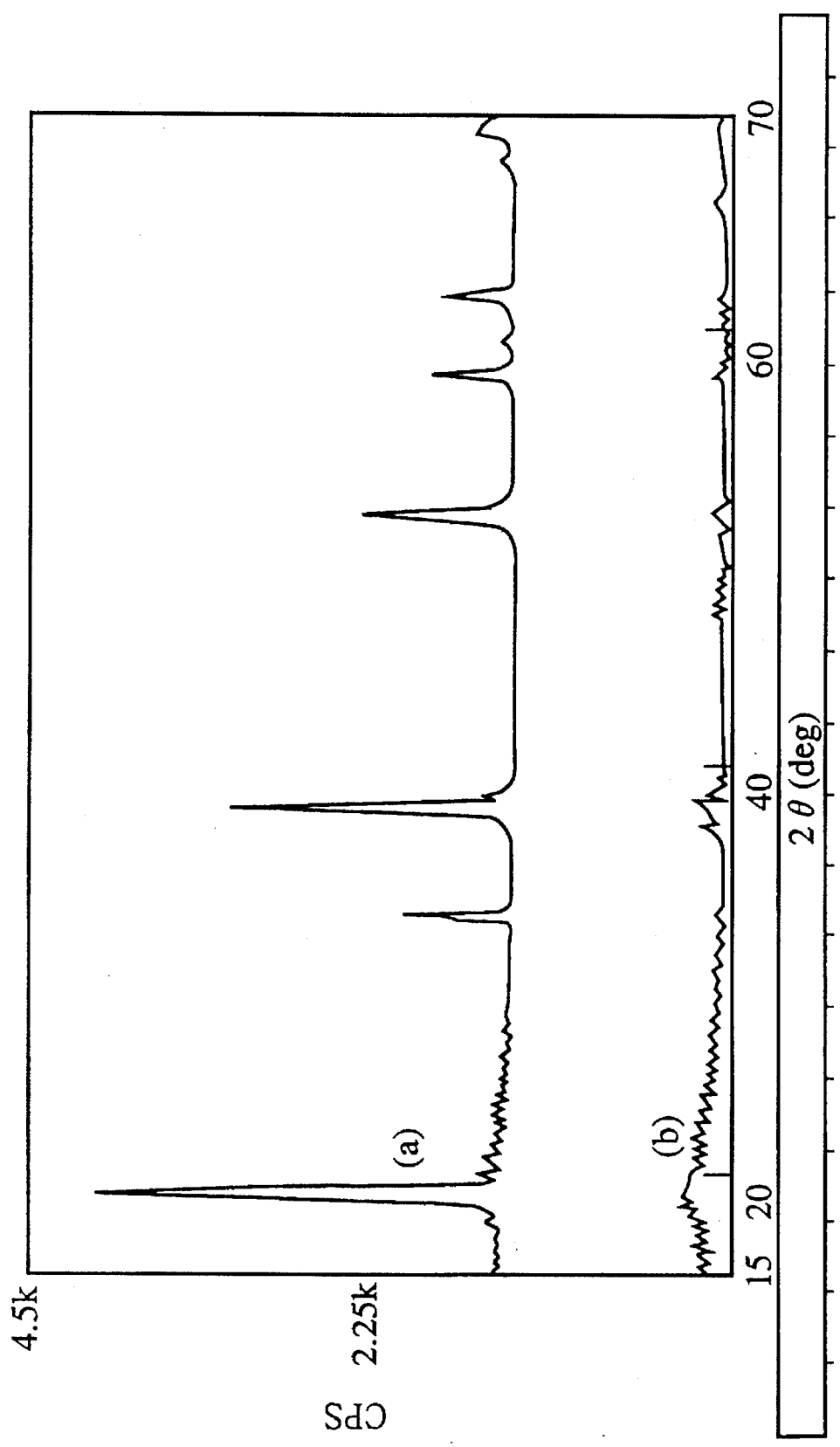
FIG. 2 is an X-ray diffraction chart.

With a standard cobalt hydroxide crystal, effect of the treatment to increase oxidation number on the crystal structure of cobalt hydroxide is examined by X ray diffraction analysis. FIG. 2 shows the result.

In FIG. 2, (a) is an X ray diffraction chart of a standard cobalt hydroxide crystal and (b) is that of a cobalt compound to which treatment to increase oxidation number has been applied at about 100° C. As shown in FIG. 2, (b) is rather flat compared to (a). This proves that the cobalt hydroxide is changed to a cobalt compound whose crystal structure is distorted by the treatment to increase oxidation number.

Next, an experiment is carried out to examine whether cobalt hydroxide is changed to cobalt oxide whose oxidation number is higher than +2 by the treatment to increase oxidation number (at 100° C.).

For measuring cobalt oxide having oxidation number higher than +2, bad solvency of +3 cobalt oxide in nitric acid is used.

First, the treatment to increase oxidation number is applied to a given amount of standard cobalt hydroxide crystals, which is washed by nitric acid solution next. The amount of cobalt dissolved in the nitric acid solution (+2 or lower) is measured by atomic absorption spectrometry, so that the amount of cobalt having oxidation number +2 or lower can be obtained.

The amount of cobalt having oxidation number +3 or higher can be obtained by reducing the amount of cobalt having oxidation number +2 or lower from the whole amount of the cobalt.

Average oxidation number of cobalt is calculated from the amount of cobalt having oxidation number +2 or lower, and the amount of cobalt having oxidation number +3 or higher.

Table 2 shows average oxidation number of a standard cobalt hydroxide crystal to which the treatment to increase oxidation number is not applied at all, and that of a standard cobalt hydroxide crystal to which the treatment is applied.

TABLE 2

| | standard cobalt hydroxide | cobalt oxide to which the treatment to increase oxidation number is applied |
|---|---|---|
| average oxidation number of cobalt | 2.0 | 2.9 (average value) |

Table 2 shows that in most cases cobalt having oxidation number +2 is changed to cobalt having oxidation number +3 by the treatment to increase oxidation number.

(Experiment 2)

In Experiment 2, open type simplified cells are produced from various nickel electrodes (the $EA_1$ and the $EA_2$ of the present invention, the $ER_1$, the $ER_2$, the $ER_3$, and the $ER_4$ of the Comparative Examples), nickel plates as the counter electrodes, and aqueous solution of KOH of about 25 wt %. The open type simplified cells are charged at 0.1 C (120 mA) for 24 hours. Discharge capacity is measured by discharging the cells at ⅓ C (400 mA) until the final discharge voltage reaches −0.8 V against the nickel plates. Utilization factors of active materials can be obtained from the ratio of the measured discharge capacity to the theoretical capacity.

Table 3 shows utilization factors of active materials of various nickel positive electrodes, and characteristics of nickel active materials constituting the positive electrodes.

TABLE 3

| | kinds of electrodes | | | | | |
|---|---|---|---|---|---|---|
| | $EA_1$ | $EA_2$ | $ER_1$ | $ER_2$ | $ER_3$ | $ER_4$ |
| 60 Å or greater pores | 20% or more | 20% or more | less than 20% | 20% or more | 20% or more | less than 20% |
| cobalt | exist on the surface | exist on the surface | not exist | not exist | exist evenly in cobalt | exist on the surface |
| treatment to increase oxidation number | × | ○ | × | × | × | ○ |
| utilization factors of active materials | 90.4 | 96.3 | 61.2 | 65.5 | 75.0 | 82.4 |

Table 3 shows the next results.

1) When comparisons of the $EA_2$ with the $ER_4$, and the $ER_1$ with the $ER_2$ are made with the same conditions except for percentage of the pores whose diameters are 60 Å or greater, the result is that the $EA_2$ and the $ER_2$, which have fine-grained active materials having the above mentioned pores, whose volume amounts to 20 vol % or more of the combined volume of all of the pores, have remarkably higher utilization factors of active materials. That means if the volume of pores having diameters 60 Å or greater is less than 20 vol % of the combined volume of all of the pores, the utilization factor is less than 85%; if the volume amounts to 20 vol % or more, the utilization factor is 90% or more.

It is considered that this occurs because electrolyte can easily permeate fine-grained active material having more pores whose diameters are 60 Å or greater so that electrode reaction area expands.

2) When the electrodes are compared in terms of existence of cobalt and the utilization factors of active materials, the result is that the electrodes which have fine-grained active materials having no cobalt (the $ER_1$ and the $ER_2$) have low utilization factors of active materials.

It is considered that this occurs because fine-grained active materials having no cobalt have bad conductivity compared to fine-grained active materials having some cobalt.

3) When a comparison is made between the $EA_1$ and the $ER_3$ in terms of the cobalt distribution and the utilization factors of active materials, the result is that fine-grained nickel active materials having cobalt on the external surface have higher utilization factors of active materials.

There is a possible reason. Even if the amount of cobalt precipitated on the external surface of the nickel hydroxide is small (cobalt: nickel hydroxide being 0.05:1), the cobalt effectively operates so that a conductive network among fine-grained active material is created. On the other hand, when cobalt evenly exists in the nickel hydroxide ($ER_3$), the conductivity among fine-grained active material goes down, so that fine-grained active material which do not contribute to electrochemical reaction increase.

4) When a comparison is made between the $EA_1$ and the $EA_2$ in terms of the treatment to increase oxidation number and the utilization factors, the result is that the utilization factor of the $EA_2$ increases more than that of the $EA_1$. There are possible two reasons.

First, by the treatment to increase oxidation number, cobalt on the active material is changed to cobalt oxide having oxidation number higher than +2 and good electric conductivity. So the conductivity among fine-grained active material improves greatly.

Second, the treatment to increase oxidation number is carried out by high temperature-heating in aqueous solution of alkali. According to this method, cobalt oxide having high oxidation number and distorted crystal structure as shown in Experiment 1 is produced. Cobalt oxide having such characteristics can combine with other substances unlike cobalt oxide having ordered crystal structure. In other words, cobalt oxide having high oxidation number, which is precipitated on the external surface of nickel hydroxide, crystallizes in a way that it combines tightly with the nickel hydroxide, so that sending and receiving electrons to and from the nickel hydroxide can be carried out certainly. Moreover, the cobalt oxide having high oxidation number and distorted crystal structure, which is precipitated on the external surface of the nickel hydroxide, has a lot of pores, so it does not prevent permeation of electrolyte. So cobalt improves conductivity very much and electrolyte can permeate the fine-grained active material, which results in high utilization factor of active material.

(Experiment 3)

In Experiment 3, over discharge characteristics are examined concerning the storage cells $X-EA_1$, $X-EA_2$, $X-EA_3$, and $X-EA_4$ of the present invention and the storage cells $X-ER_1$, $X-ER_2$, $X-ER_3$, and $X-ER_4$ of the Comparative Examples.

In order to measure the over discharge characteristics, cells are charged at electric current of 1 C (1200 mA) in room temperature. After charging voltage shows the maximum volume, charging is completed when the voltage lowered 10 mV ($-\Delta V$). The storage cells are left untouched for an hour. Then discharging at 1 C is carried out, and this discharging is completed when the discharge voltage becomes 1 V. Discharge capacity is being measured throughout the whole discharge process.

After this charging and discharging, a cycle of 16 hour compulsive discharging at 0.05 C is repeated five cycles, and over discharge capacity is measured by the discharge capacity of the fifth cycle.

The ratio of the discharge capacity to the over discharge capacity is treated as an over discharge characteristic.

Table 4 shows the over discharge characteristic of each storage cell.

TABLE 4

| | X-EA$_1$ | X-EA$_2$ | X-EA$_3$ | X-EA$_4$ | X-ER$_1$ | X-ER$_2$ | X-ER$_3$ | X-ER$_4$ |
|---|---|---|---|---|---|---|---|---|
| over discharge characteristic | 88.5 | 90.7 | 92.6 | 93.4 | 70.4 | 73.7 | 76.2 | 78.4 |

Table 4 shows that the storage cells X-EA$_1$ to X-EA$_4$ of the present invention have more excellent over discharge characteristics than the storage cells X-ER$_1$ to X-ER$_4$ of the Comparative Examples.

Especially, over discharge characteristics are remarkably improved in the X-EA$_3$ in which zinc oxide powder is added to the nickel electrode. (The zinc oxide exists in a way that it does not combine with the fine-grained nickel active material), and in the X-EA$_4$ in which lithium hydroxide is added to the electrolyte.

This proves that addition of metal zinc powder and zinc compound powder to the fine-grained nickel hydroxide active material of the present invention improves over discharge characteristics. It also proves that the nickel alkali storage cell comprising the nickel positive electrode including the fine-grained nickel hydroxide active material of the present invention, and the electrolyte including lithium hydroxide, has excellent over discharge characteristic.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they would be constructed as being included therein.

What is claimed is:

1. A fine-grained, nickel electrode active material comprising nickel hydroxide having pores wherein 20 vol % or more of the total volume of the pores comprises pores having a diameter of 60 Å or greater, and having cobalt or a cobalt compound formed on external surfaces of the nickel hydroxide.

2. A nickel electrode active material according to claim 1, wherein the cobalt compound on the external surfaces of the nickel hydroxide is a cobalt oxide having a distorted crystal structure and an oxidation number higher than +2.

3. A nickel electrode active material according to claim 1, wherein zinc, cobalt or cobalt and zinc are in solid solution with the nickel hydroxide.

4. A method for producing a fine-grained, nickel electrode active material, which comprises:

adding alkali to a stirred solution having a nickel compound dissolved therein to precipitate nickel hydroxide having pores wherein 20 vol % or more of the total volume of the pores comprises pores having a diameter of 60 Å or greater, to form a stirred suspension of the nickel hydroxide;

dissolving a cobalt compound in the stirred suspension; and gradually adding alkali to the stirred suspension of the nickel hydroxide having a cobalt compound dissolved therein to precipitate cobalt hydroxide on external surfaces of the nickel hydroxide.

5. A method according to claim 4, wherein a zinc compound, a cobalt compound or a mixture of zinc and cobalt compounds is dissolved in the stirred solution having a nickel compound dissolved therein.

6. A method according to claim 4, which comprises the additional step of heating the nickel hydroxide having cobalt hydroxide on the external surfaces thereof with an alkali metal hydroxide and oxygen to change the cobalt hydroxide to a cobalt oxide having an oxidation number higher than 2+.

7. A method according to claim 4, which comprises the additional steps of:

impregnating the nickel hydroxide having cobalt hydroxide on the external surfaces thereof with a solution of an alkali metal hydroxide; and heating the alkali metal hydroxide-impregnated nickel hydroxide having cobalt hydroxide on the external surfaces thereof to 50°–150° C. in an atmosphere containing oxygen to change the cobalt hydroxide to a cobalt oxide having a distorted crystal structure and an oxidation number higher than +2.

8. A positive nickel electrode for an alkali storage cell comprising:

a fine-grained, nickel electrode active material comprising nickel hydroxide having pores wherein 20 vol % or more of the total volume of the pores have a diameter 60 Å or greater, and having cobalt or a cobalt compound formed on external surfaces of the nickel hydroxide; and 1–5 wt % of a powder of metallic zinc or of a zinc compound containing 1–5 wt % of zinc, based on the weight of the nickel hydroxide, added to the fine-grained nickel electrode active material.

9. A positive nickel electrode according to claim 8, wherein the cobalt compound is a cobalt oxide having a distorted crystal structure and an oxidation number higher than +2.

10. A nickel positive electrode according to claim 8, wherein zinc, a cobalt or cobalt and zinc are in solid solution with the nickel hydroxide.

11. A nickel alkali storage cell comprising:

a nickel electrode, comprising a fine-grained, nickel electrode active material comprising nickel hydroxide having pores wherein 20 vol % or more of the total volume of the pores have a diameter 60 Å or greater, and having cobalt or a cobalt compound formed on external surfaces of the nickel hydroxide;

a negative electrode placed spatially apart from the nickel electrode; and an alkali electrolyte comprising a 7–8.5N alkali metal hydroxide.

12. A storage cell according to claim 11, wherein the alkali metal hydroxide includes lithium hydroxide.

13. The nickel alkali storage cell of claim 11, wherein the cobalt compound is a cobalt oxide having a distorted crystal structure and an oxidation number higher than +2.

14. A nickel alkali storage cell according to claim 11, wherein a zinc, cobalt or zinc and cobalt are in solid solution with the nickel hydroxide.

* * * * *